United States Patent
Hughes et al.

(10) Patent No.: US 6,606,650 B2
(45) Date of Patent: *Aug. 12, 2003

(54) BUMP IN THE WIRE TRANSPARENT INTERNET PROTOCOL

(75) Inventors: Earnest E. Hughes, San Antonio, TX (US); John A. Murphy, San Antonio, TX (US); Lewis T. Donzis, San Antonio, TX (US)

(73) Assignee: Nortel Networks Limited, St. Laurent (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/385,389

(22) Filed: Aug. 30, 1999

(65) Prior Publication Data

US 2003/0074466 A1 Apr. 17, 2003

(51) Int. Cl.$^7$ .............................. G06F 15/167
(52) U.S. Cl. ................... 709/213; 709/238; 709/250
(58) Field of Search ................. 709/213, 214, 709/215, 216, 223, 225, 229, 249, 250, 238

(56) References Cited

U.S. PATENT DOCUMENTS

| | | | | |
|---|---|---|---|---|
| 6,023,563 A | * | 2/2000 | Shani | 709/249 |
| 6,058,429 A | * | 5/2000 | Ames et al. | 709/250 |
| 6,112,235 A | * | 8/2000 | Spofford | 709/223 |
| 6,167,438 A | * | 12/2000 | Yates et al. | 709/223 |
| 6,233,618 B1 | * | 5/2001 | Shannon | 709/229 |
| 6,240,461 B1 | * | 5/2001 | Cieslak et al. | 709/225 |
| 6,389,462 B1 | * | 5/2002 | Cohen et al. | 709/229 |

FOREIGN PATENT DOCUMENTS

WO    WO9908429    2/1999

OTHER PUBLICATIONS

Peter Danzig, NetCache Architecture and Deploymnet, White Paper Network Appliance, Feb. 1997, 10 pages.*
Product Brochure, Intel's Transparent Cache Switching, Jan. 1999, 5 pages.*
Ervin Johnson, Increasing the Performance of Transparent Caching with Content–aware Cache Bypass, 4$^{th}$ International Web Caching Workshop, Apr. 1999, 4 pages.*
P. Krishman et al., Transparent En–Route Caching in WANs?, 4$^{th}$ International Web Caching Workshop, Apr. 1999, 10 pgs.*

(List continued on next page.)

*Primary Examiner*—Patrice Winder
(74) *Attorney, Agent, or Firm*—Blakely Sokoloff Taylor & Zafman LLP (57) ABSTRACT

A technique for providing a device referred to as a transparent bump between a local area network and a router. The device is inserted with minimal intrusion to the devices on the LAN to provide a certain operation, such as web caching. The device initializes at start-up in the promiscuous mode to learn the MAC address of the router and subsequently accepts data packets destined to the router for internal processing. Accesses to a web page are checked in the device to determine if cached data is present, so that redundant accesses are reduced. The device initializes and performs its intended function transparently to a user on the local area network.

27 Claims, 6 Drawing Sheets

OTHER PUBLICATIONS

Halsall, Fred: "Data Communication, computer networks and open systems" 1996, Addison–Wesley, Harlow, Essex, UK XP002161343, p. 393 1. 7–41; p. 395 1. 1–35.

"TCP Session Processing Performance Evaluation via Layer 4 Switching". The Tolly Group, http://www.alteon.com. Sep. 1999. pp. 1–6. Alteon 180e Web Switch versus Foundry Networks' ServerIron™.

"8–Port 10/100 MBPS L4+ Ethernet Server Switch". Alteon Networks, http://www.alteon.com. Cache director.

ArrowPoint Communications. Inc. Product Overview, http://www.arrowpoint.com.

"ArrowPoint CS–100 Content Smart Web Switch". ArrowPoint Communications, Inc. http://www.arrowpoint.com.

"ArrowPoint CS–800 Content Smart Web Switch". ArrowPoint Communications, Inc. http://www.arrowpoint.com.

BigIron Architecture Brief, http:/www.foundrynet.com. 1997–99 Foundry Networks.

"Cutting Through Layer 4 Hype". http://www.foundrynet.com.

"Foundry Networks' ServerIron and Web Caching", Foundry Networks, Nov. 1998, 3 pages.

\* cited by examiner

BUMP IN THE WIRE TRANSPARENT INTERNET PROTOCOL

BACKGROUND OF THE INVENTION

1. Field of the Invention

The present invention relates to the field of network protocols for data transfer and, more particularly, to a transparent device utilize to process data flow between a network and a router.

2. Background of the Related Art

Figure 1:
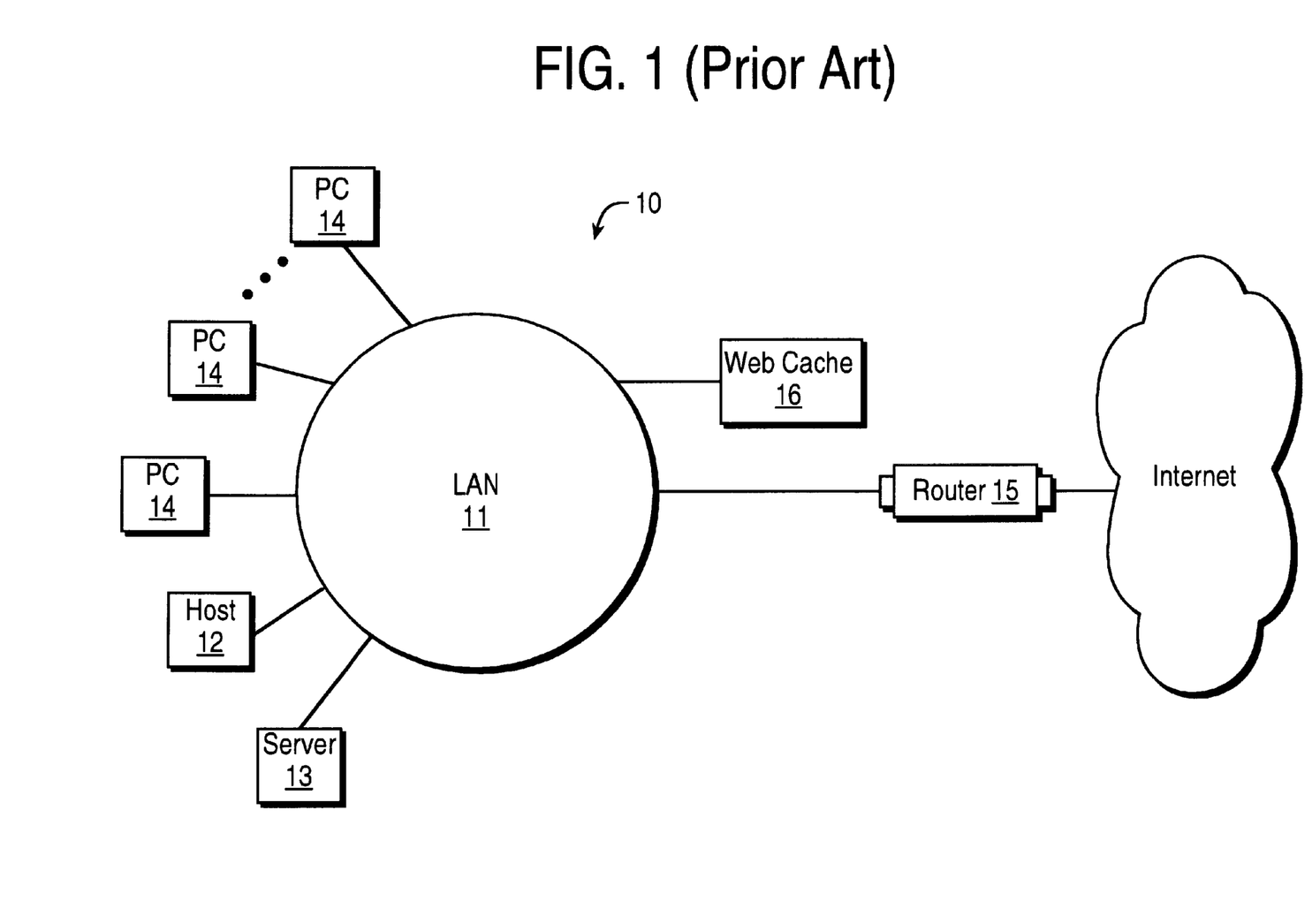
FIG. 1 is a system diagram of a prior art system in which a local area network is coupled to the Internet through a router.

In the field of computing devices, communication is often achieved over a local area network (LAN). FIG. 1 illustrates one such example. In FIG. 1, a system 10 is shown in which a variety of devices are coupled to a LAN 11. A host computer 12, a server 13 and a plurality of users 14 (shown as a personal computer, PC) are connected to the LAN 11. Two of the more well known local area networks are the Ethernet and Token Ring networks. The general configuration and operation of a LAN are well known.

The LAN 11 is also shown connected to an external network. In the example of FIG. 1, the LAN 11 is connected to the Internet through a router 15. The router 15 functions as an interface in transferring data between the devices on the LAN 11 and the Internet. Usually, the data is transferred in packets. It is understood that the Internet is a medium for having many such networks coupled to it, as well as individual devices, and that the data transfer is between these various devices accessing the Internet. The packetizing of data (and unpacking at the other end) is controlled by the "transmission control protocol" (TCP) and the manner of routing is controlled by the Internet protocol (IP). Together, the TCP/IP protocol establishes the manner in which intelligence is transferred over the Internet.

In the LAN 11 example, each device on the LAN 11 has a network address (for example, an Ethernet address for an Ethernet network) which identifies the physical address of the device on the LAN 11. The physical address is also referred to as a media access control (MAC) address. Each device also has an IP address, which is associated with the location of the device over the whole of the Internet. By knowing a destination IP address, two devices can communicate over the Internet. An address resolution protocol (ARP) is used to allow a host on the network to request the hardware address given in a particular IP address. The router 15 typically includes an ARP table which retains the MAC address associated with a given IP address.

The system 10 also shows a web cache 16 connected to the LAN 11. The web cache 16 is utilized for caching pages which are accessed on the World Wide Web (WWW). Typically, these web sites and pages on the web sites are accessed by noting the IP address or the Uniform Resource Locator (URL) for the web site page. The caching of web pages is well known. Caching (which is the storing of recently used data in a memory device) is used to view a previously accessed web page without actually returning to the destination to retrieve it.

The web cache 16 is separate from the cache memory allocated by a web browser program of each PC 14. Instead of an individual cache, the web cache 16 is a network cache utilized by the devices on the LAN 11. Network web caching allows the network to cache a given web site/page for plurality of users on the LAN 11. Accordingly, the system 10 provides for caching of a particular web page in the web cache 16 for access by more than one device on the LAN 11.

However, in order to provide the caching function, the web cache 16 is treated as a separate device which must be accessed by the various devices on the LAN 11. That is, when the web cache 16 is added onto the LAN 11, each Internet accessing device must be programmed to utilize the device 16 for caching the web page. Typically, some programming input is required at each device to identify the web cache 16 as a device to be accessed for caching the web page data. However, once so programmed, an IP address access for a web site from each programmed PC 14 will now access the web cache 16 for the presence of that page, before the access is sent out onto the Internet.

As noted, in order to implement the web cache of FIG. 1, some form of programming is required for one or more devices currently present on the LAN 11 to use the web cache 16 for its caching function. The web cache 16 cannot be readily inserted into the LAN 11 to perform the caching function, unless some programming is provided for each device to utilize the caching function of the web cache 16. In the Internet web page example described, this programming identifies the web cache 16 for performing the caching function for the web browsers utilized on the LAN devices. This generally requires some appreciable programming to be performed on each machine or device. Further, if the web cache 16 becomes inoperative or is removed from the LAN 11 (or simply LAN caching is no longer desirable), the reprogramming of the devices on the LAN 11 will be required to remove the web cache 16.

Accordingly, a device not having the requisite set up programming for its utilization would be desirable to provide such functions on the LAN (such as web caching). Such a device would be transparent to other devices on the LAN at set up, so that a "plug-and-play" feature would allow individual set up of the devices on the LAN.

The present invention describes a scheme in which such transparency is provided.

SUMMARY OF THE INVENTION

The present invention describes a technique for providing a device referred to as a transparent bump between a local area network and a router. The device is inserted with minimal intrusion to the devices on the LAN. The device initializes at start-up in the promiscuous mode to learn the MAC address of the router. Once the router's address is known, the device accepts data packets intended for the router and provides internal processing of the data prior to having the data forwarded to the router. Since the device performs the interception without reprogramming user devices on the local area network, the operation is transparent to the local area network.

In the particular example described, the transparent bump provides a web caching function. Accesses to a web page are checked in the device to determine if cached data is present. If the data is present, then the cached data is provided to the requesting device on the local area network. Otherwise, the web site is reached and the returning data is cached.

Although web caching is described, other functions, such as filtering of certain data, can be readily implemented. Furthermore, in order to provide control access to the device, the device can accept either its own address or a particular TCP port coding to switch the device into a control mode.

DETAILED DESCRIPTION OF THE INVENTION

Figure 2:
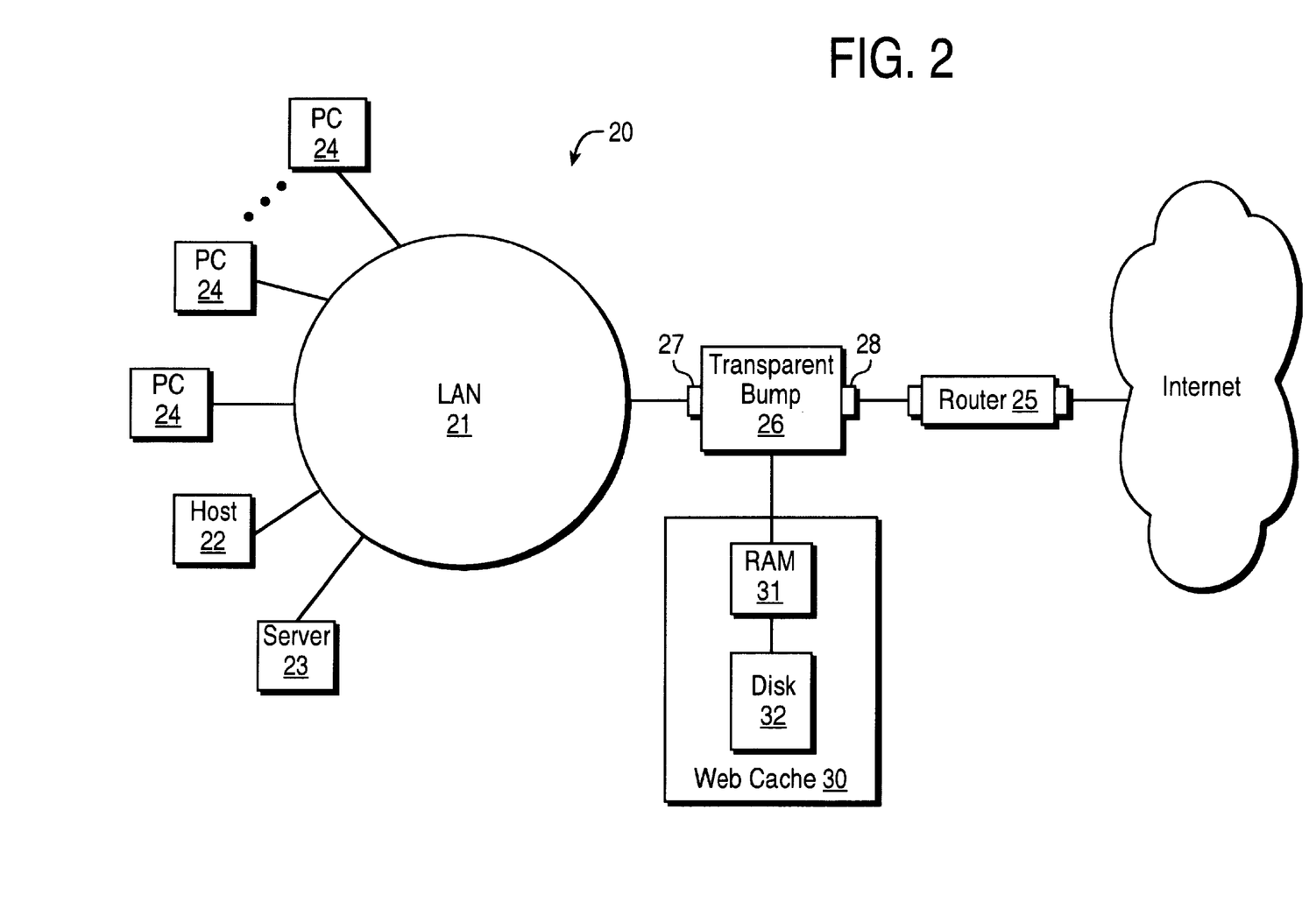
FIG. 2 is a system diagram of a local area network that is coupled to the Internet through a router, but in which the transparent bump of the present invention is interposed between the local area network and the router to provide a web caching function.

Referring to FIG. 2, a network system 20 is shown in which the network 20 provides a medium for data transfer between or among devices coupled to the network. The network system 20 shown is equivalent to the system 10 shown in FIG. 1, but now with the inclusion of a device for practicing the present invention. The network system 20 includes a local area network (LAN) 21, to which a variety of devices are coupled. A host computer 22, a server 23 and a plurality of users 24 (shown as a personal computer, PC) are coupled to the LAN 21. The LAN 21 and the devices 22–24 coupled to it can be the LAN 11 described in reference to FIG. 1. Again, two of the more well known local area networks are the Ethernet and Token Ring networks. It is appreciated that other devices, although not shown, can be coupled to the LAN 21 and function utilizing the LAN 21.

A router 25 is also present for interfacing the LAN 21 to another network. In the example, the other network coupled to the router 25 is the Internet. Thus, LAN 21 can communicate with a variety of networks and devices coupled to the Internet and its World Wide Web (also referred to as WWW, or simply the Web). The router 25 functions equivalently to the router 15 in FIG. 1 to couple the LAN 21 to the Internet, with the exception that a device is interposed between the router 25 and the LAN 21.

As shown in FIG. 2, a device 26 (referred to as a "transparent bump") is placed between the LAN 21 and the router 25. Essentially in the embodiment shown, the device 26 is interposed serially between the LAN 21 and the router 25, which LAN and the router can be devices in current practice (see FIG. 1). That is, a connection between the LAN 11 and the router 15 of FIG. 1 can be "broken" and the device 26 interposed serially in between the two, resulting in the system shown in FIG. 2. Generally, prior to the inclusion of device 26, the LAN 21 is coupled to the router 25. The access to the Internet from LAN 21 is controlled by the router 25. The devices 22-24 on the LAN 21 are configured to operate with the router 25 and programs, such as a web browser, are configured to access the router for linking to the Internet.

The device 26 of the present invention is referred to as a transparent bump, since it can be installed transparently (somewhat akin to a "plug-and-play" device) in the path between the LAN 21 and the router 25 without requiring the reprogramming of each of the devices coupled on the LAN 21. The device 25 is a "bump" (presence) in the path to the router, but is transparent (not noticeable) to the users coupled on the LAN 21.

As shown in FIG. 2, the LAN 21 is coupled to one port 27 of the device 26, while the router 25 is coupled to a second port 28. A purpose of the bump device 26 is to interject some function along the path. In the particular example, a web caching device (web cache) 30 is utilized to provide a web caching operation for the LAN 21. That is, the web cache 30 functions equivalently to the web cache 16 of FIG. 1 in providing the caching function of web pages for the users 14 coupled onto the LAN 21. However, unlike the web cache 16, web cache 30 does not require reprogramming of individual devices on the LAN 21 for it to operate properly to provide the web caching function. In the particular example, web cache 30 provides the web caching function by utilizing a random access memory (RAM) 31 and some form of disk (magnetic, optical) 32 or solid state storage to store the various cached web pages. Disk 32 storage is shown in FIG. 2. The transparent bump device 26 is shown in more detail in FIG. 3.

Figure 3:
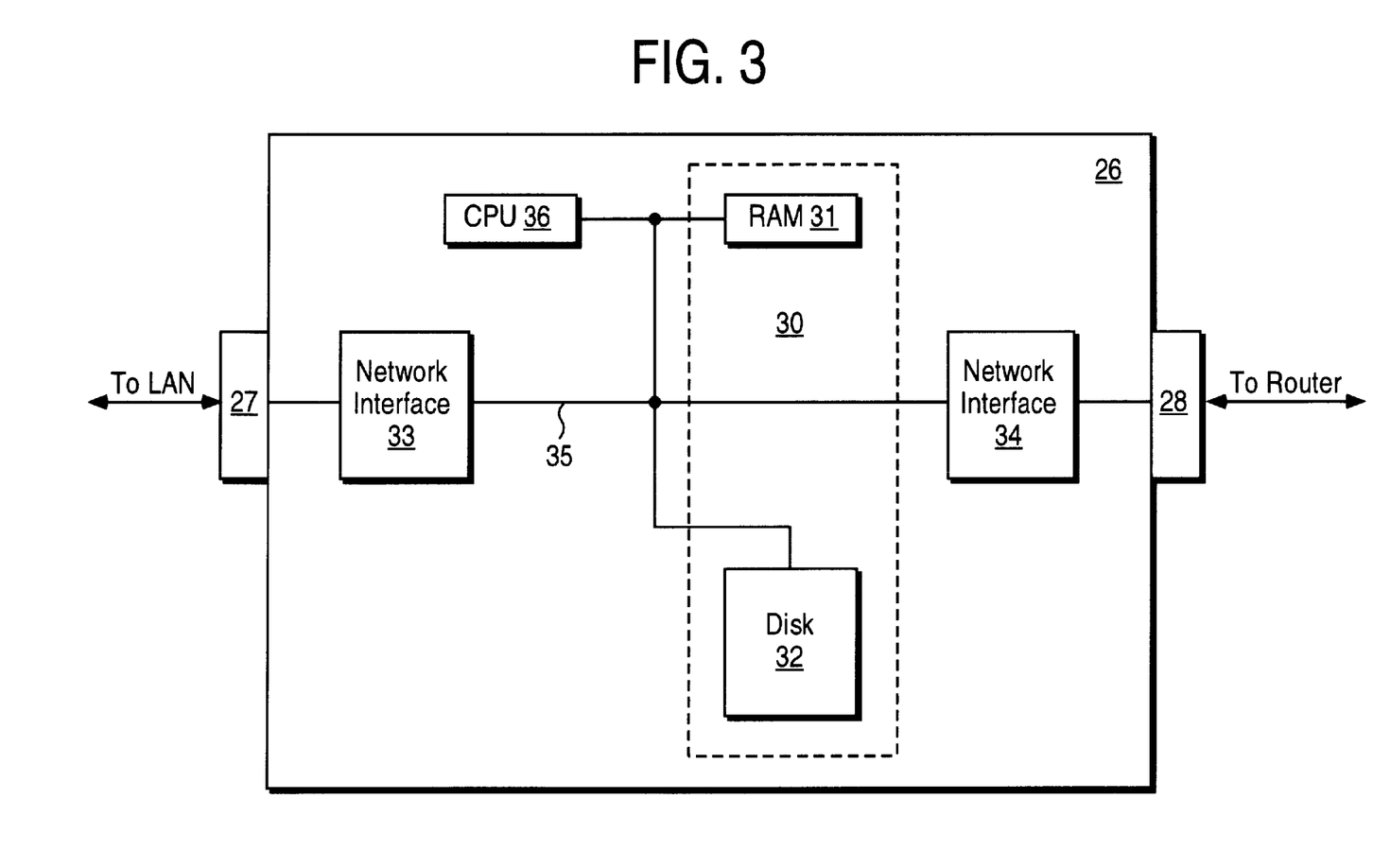
FIG. 3 is a circuit block diagram showing the components of the transparent bump of FIG. 2.

Referring also to FIG. 3, a network interface (such as an Ethernet network card for Ethernet systems) 33 is shown coupled to port 27, while a similar interface 34 is coupled to port 28. An internal bus 35 is shown coupling the two interfaces 33, 34, as well as the other devices, including the RAM 31 and disk 32. A processor 36 (referred to as a central processing unit or CPU) is also coupled to the bus 35 for controlling the operation of the various components of device 26. Although only one bus 35 is shown, multiple buses can be utilized. For example, the CPU 36 may be coupled to a main system bus, while peripheral units (such as the interfaces 33, 34 and the disk 32) may be coupled to an Input/Output bus or a peripheral component interconnect (PCI) bus. Although separate storage devices could be used, the illustrated embodiment uses RAM 31 and disk 32 as the storage media for the web cache 30.

A program is resident on the disk 32 for execution by the CPU 36 for the operation of the device 26. Typically, the device 26 is inserted in the path to the router of an existing system having a LAN coupled to the router. In physical terms, a connection from the LAN 21 is made to port 27 and a connection to the router is made at port 28. When this is done, each interface 33, 34 will have its own LAN (MAC) address. However, to maintain the transparency, the ports do not rely on their MAC address. Instead, the device 26 at initial set-up places both interfaces 33, 34 into a promiscuous mode.

Promiscuous mode of operation is a known mode of practice. Generally, a network interface on a LAN responds to receiving data packets, only when the particular interface is the addressed destination. However, when in the promiscuous mode of operation, the interface will accept any data packet, whether it is addressed to the interface or to some other destination. By having the network interface 33 operate in the promiscuous mode, all traffic on the LAN 21 is received by the device 26. The interface 34 also operates in this mode so that all data packets coming from the router are also received.

Initially, while both interfaces 33, 34 are in the promiscuous mode, all data packets from the LAN 21 are passed through to port 28 and to the router 25. Since the router 25 had previously been configured to operate with the LAN 21, those packets destined to the router 25 will still be accepted by the router 25. Those packets destined for other devices on the LAN 21 will be ignored by the router. At this point device 26 has not yet learned of the address associated with the router 25.

However, when the device receives a data packet from the router 25 at interface 34, it will have learned the LAN address associated with the router 25. This is so since a data packet will have both source and destination MAC addresses corresponding to the data packet. Since the router 25 only sends packets destined for the LAN 21 back toward the device 26, the router's address will be learned when this first data packet is received at port 28.

Once the MAC address of the router is known to the device 26, port 27 is removed from the promiscuous mode. The interface 33 will now switch its mode of operation to accept all packets having the router MAC address. All other MAC addresses can be ignored. It is appreciated that the port 27 could perpetually operate in the promiscuous mode to accept all addresses, but it need not do so once the router address is known. It is more efficient for the device 26 to handle only the traffic destined for the router 25 once the router's MAC address is learned.

The interface 34 and port 28 always operate in the promiscuous mode since the router will be sending packets to various devices on the LAN 21. Thus, port 28 is maintained perpetually in the promiscuous mode. When the above set-up procedure is completed, port 27 is configured to accept packets from multiple sources on the LAN 21, but having a single destination, which is the router 25. The port 28 receives packets from a single source (which is the router 25), for distribution to multiple destinations on the LAN 21.

A cross-reference table, somewhat similar to a router table in a typical router, is maintained in the RAM 31 of the device 26 to cross-reference the various IP addresses of the devices on the LAN 21 to its MAC (or physical) address. Thus, as data packets flow through device 26, the device learns and associates an IP address with the corresponding MAC address.

Once in the normal operational mode, the device 26 performs its intended task. In the example, device 26 has been programmed to operate as a web cache. In that respect, when a web page access is attempted by a device on the LAN 21, device 26 will perform the caching function. It is appreciated that the caching scheme can be set up in a number of ways, but generally there is an "expire" time associated with most web caching techniques. That is, a web page previously accessed is stored and retained in the web cache 30. Subsequent attempts to access the particular web page by a user on the LAN 21 is first checked for in the web cache 30, and if resident and not stale, the cached information is returned to the requesting user, instead of sending the request out on the Internet to access the web page. Whenever new data is returned from a web server coupled to the Internet, the device 26 will cache the data.

The web caching would be provided for the complete LAN 21, so that multiple users 24 on the LAN 21 would access the same cached data. The programming is maintained in the device 26, so reprogramming of each user device on the LAN 21 is not needed. Furthermore, since the device 26 learns of the device addresses on the LAN 21, including the router 25, the device interface 33 can be set to accept the router address and ignore addresses of other devices on the LAN 21. Thus, other than the physical connection required and the initial set-up time, the device 26 is transparent to the users on the LAN 21.

It is appreciated that in some instances, it is desirable to access the device 26 from the LAN 21. In some instance it may be desirable to reprogram the programming in the device 26 remotely, or obtain records of transactions handled by the device 26. Two techniques are available to access the device 26 remotely. One technique is to send a packet using the actual interface 33 address as the destination address. As noted, the interface 33 (such as an Ethernet card) will have a unique IP address associated with it. It is set so that this address is always accepted.

When the unique interface address is present in the data packet as the destination address, the device receives the packet and understands that the packet contains control commands for the device 26 and enters the command mode. The control command directs the device 26 to perform some internal control function, such as providing performance or operative information about the device itself.

Another technique for differentiating a data packet destined for the device 26 versus data packets destined for the router is by the use of special marks added to the IP address. For example, in the IP address string, a special code is appended to the end of the IP address. For example, an IP address can be listed to end in ":280" to signify to the device 26 to enter into the control mode to process this data packet. If the IP address does not end in the ":280" suffix, the data packet is treated as any other packet for passage through the device 26 to the router 25. It is appreciated that other schemes can be readily implemented to switch the device from its normal data passing mode to its control mode. Furthermore, if desired, this remote accessing capability for entering the control mode could be established through port 28 as well.

Figure 4:
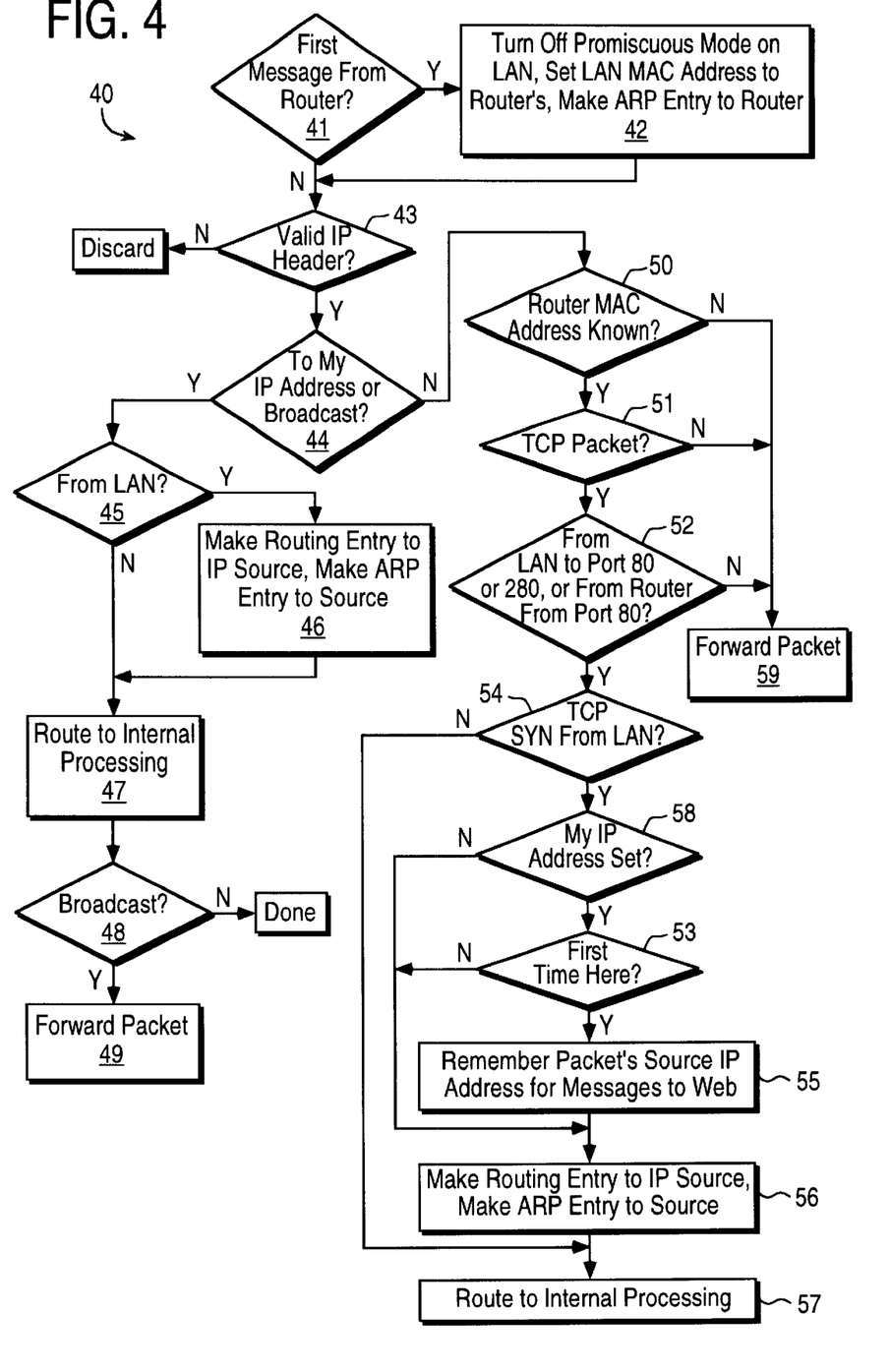
FIG. 4 is a flow diagram performed by a program resident in the device of the present invention for performing the caching operation.

A diagram 40 showing the operation of the software for performing the present invention is shown in FIG. 4. It is understood that the device 26 initializes at start-up, having both ports 27, 28 in the promiscuous mode. All data packets from the LAN 21 are passed to the router in this mode of operation. When the first message is returned from the router (block 41), the promiscuous mode is turned off on the LAN side port 27 (block 42). The port 27 is then set to accept the same MAC address as the router 25 to receives packets destined to the router 25. A dummy ARP entry is made to the router's MAC address with an infinite timeout and uses this IP address as a default address to the router 25 for sending internally generated packets out through the router 25.

All incoming messages from either port 27, 28 are checked for a valid IP header (block 43) and then checked to determine if the device should enter the control mode (block 44). If the packet source is from the LAN (block 45), a routing entry to the IP source is made and an ARP entry is made to the source (block 46), prior to allowing the routing to the internal processing (block 47). If the packet was intended as a broadcast to the LAN, then the data handling follows this path from block 44 and processed internally (if necessary) for whatever the intended broadcast, prior to forwarding the broadcast through to the device 26 (blocks 48 and 49). This allows the device 25 to handle general broadcasts to the devices on the LAN 21.

If the received packet is not a broadcast nor does it have an IP address other than the device 26, then it is regarded as a message not intended for the device 26 and takes the other path at block 44. If the router MAC address is not known, then the packet is not processed at all and forwarded to the router (block 50). If the router's MAC address is known, the packet is checked to determine if it is a TCP packet (block 51). If not a TCP packet, then it is forwarded (block 59). If it is a TCP packet, a port number of the IP address is checked. If the port number is to a web page (such as to port 80) (block 52), then the packet is redirected toward the web cache to check for the TCP SYN from the LAN (block 54). If it is TCP SYN from the LAN, then it is checked for the IP address set (block 58). The first time the packet is present (block 53), the device 26 retains the source IP address of the packet (block 55). This IP address is later used as the address for requests from the web cache to the web server located on the Internet, because the replies from the web server will be directed back to the web cache. Accordingly, any TCP packets from the web server will reference the IP port 80, which reach the web cache from the router 26.

In order to keep track of the various packets and the source locations where the data is to be returned, a cross-reference table (similar to a router entry table) is used. This is needed since the device 26 cannot send ARP requests if it does not have an IP address. An IP source address from a device on the LAN 21 is maintained in the table so that a cached packet from the web server can be directed to the requesting device (block 56). In the event ":280" designation is used to access the control mode of the device 26, block 52 ensures that this action is provided when ":280" is present on the IP address header. Block 57 shows the caching function being performed internally. Otherwise, the data packet is forwarded (block 59).

The device 26 with its routine allows the various devices on the LAN 21 to communicate with the router as if the device 26 was not present. Thus, device 26 is transparent to the LAN 21 and router 25. When a web page access is attempted from a particular user, the IP address specified from the user is to a web server accessible through the Internet. The TCP packet is directed to the router 25 for the Internet access. However, the attempted access is intercepted by the device 26. The user is not aware of this interception. It is to be noted that the examples described perform data transfers by use of packets of data. However, the invention need not be limited to processing packets only. The invention can be adapted to other forms of data transfer as well.

Figure 5:
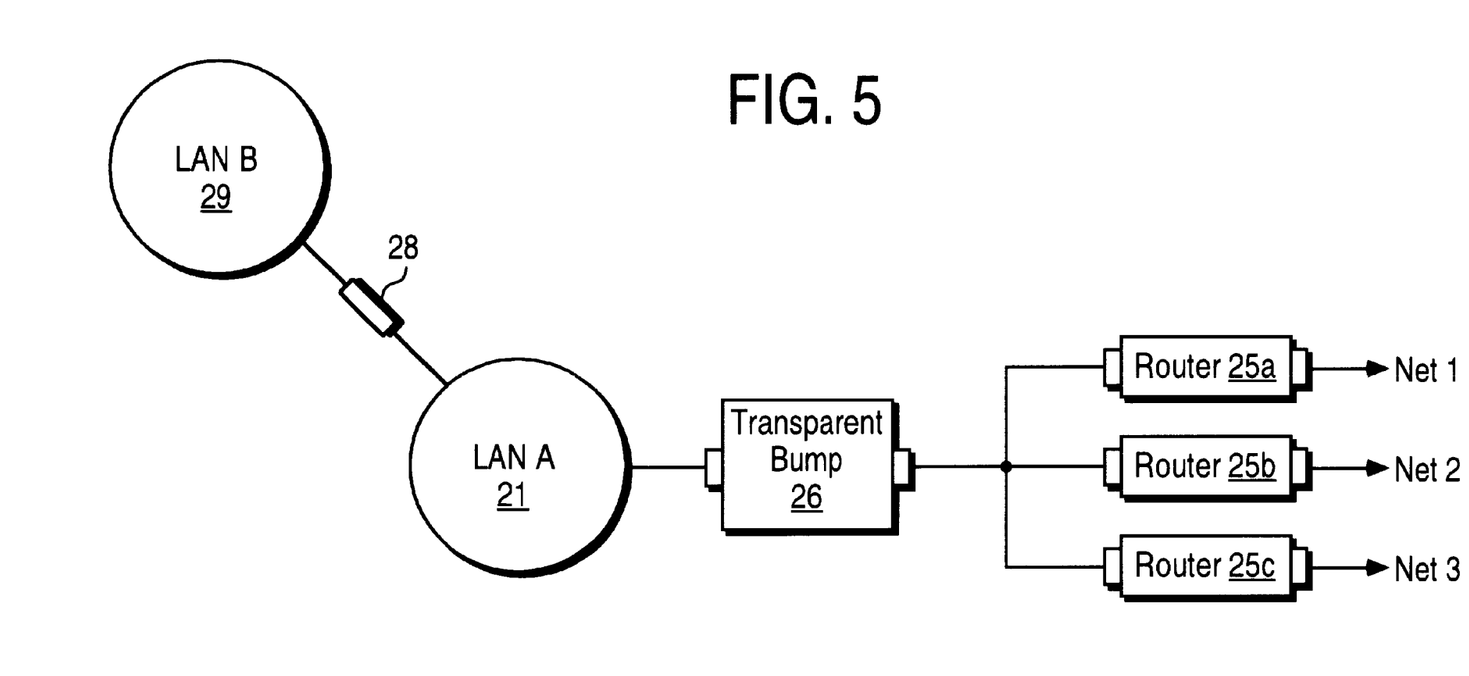
FIG. 5 is an alternative system diagram in which two local area networks transition data through the transparent bump of the present invention to a plurality of routers.

It is also to be noted that the present invention is not limited for use on a single LAN or a single router. Accordingly, as shown in FIG. 5, LAN 21 is shown coupled to a second router 28, which is coupled to a separate LAN 29. In the example, LAN 29 operates as a "subnet" to LAN 21. However, since the devices on LAN 29 utilize the router 28 for connection onto the LAN 21, all devices of LAN 29 would be identified by the device 26 as having a LAN 21 address associated with router 28. Thus, all accesses from LAN 29 would be treated as an access by router 28 on LAN 21 by the device 26. Accordingly, a number of such subnets can be coupled to LAN 21 and serviced by the device 26 of the present invention.

Likewise, a number of routers 25a–c can be coupled to the router side of the device 26. Each router could be coupled to a different network or to the same network (such as the Internet) through different channels or ports. In this instance, each router 25a–c would have different MAC addresses, so that each router would send its identifying information when responding to the LAN 21. This is not a problem, since the router side of the device 26 is always in the promiscuous mode. Other example configurations can be readily implemented without departing from the spirit and scope of the present invention.

Furthermore, the embodiment described above utilizes the device 26 for the web caching function. However, the device 25 can be configured to provide other functions as well. For example, instead of caching the web page data, the device 26 can be utilized to cache other data as well. File transfer protocol (FTP) accesses can be cached where such ftp accesses are repetitive for users on the LAN.

Figure 6:
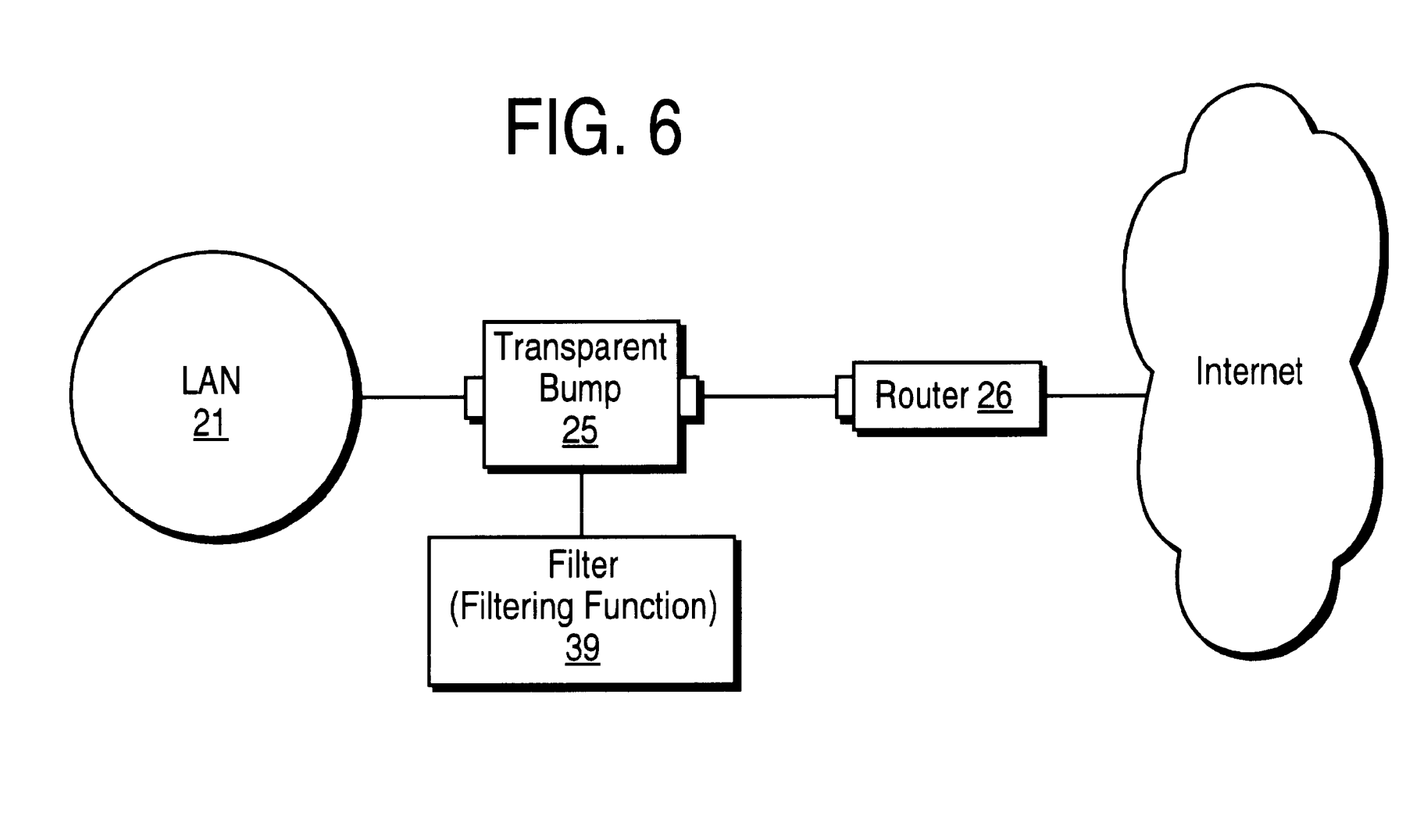
FIG. 6 is the system of FIG. 2 but in which the transparent bump of the present invention is used to provide a filtering function for the local area network.

In addition, as shown in FIG. 6, various types of filtering functions can be performed (block 39). For example, particular addresses can be filtered so that such accesses will not reach the Internet. This type of access filtering can be used to control web page accesses to forbidden URLs. A content access control can be implemented to prevent retrieval of certain types of data content, such as pornography. The content filtering would require analyzing the data from the router, which is being retrieved in response to a request from a user on the LAN. In these instances, the device 26 can be placed into position between the LAN and the router to perform the desired function with minimum of downtime of the LAN. The device would be transparent to the user, since the user on the LAN would not recognize the presence of the device. The user would still send the message as though the access was to the router 25.

Thus, the invention provides a transparent bump for network access to the Internet or to any other network. In the example described, the device of the present invention is utilized as a web cache. Also, the invention is shown as a box which is physically placed between the LAN and the router. However, as can be surmised by those familiar with computer systems, the functional blocks shown in FIG. 3 correspond to a personal computer (PC). Hence a PC can be utilized as the device 26 of the present invention to perform the web caching function for the LAN, or any other desired operation.

Thus, a scheme for providing a bump in the wire transparent protocol is described. It is appreciated that the scheme provides an interception point or connection in the data path from the LAN to the router. At this interception connection, some processing is performed, whether it is caching, filtering or some other function. The processing of the data is transparent to the users or devices on the LAN.

We claim:

1. An apparatus for transparently processing data between a first network and a router comprising:
  a first interface adapted for coupling to a first network;
  a second interface adapted for coupling to the router that is coupled to a second network;
  a processor coupled to said first and second interfaces, to receive data from the first network and to pass the data to the router until a response is provided by the router in response to an access from the first network, the response allowing said processor to learn an address of the router, said processor then adjusts said first interface to receive data destined for the router and processing the data without having devices on the first network reconfigured to perform the processing; and
  a storage medium for storing data returned from the router in response to the access from the first network to the second network.

2. The apparatus of claim 1 wherein said first interface is coupled to the first network being a local area network (LAN) to process selected data transmitted from the LAN to the router.

3. The apparatus of claim 2 wherein said router is coupled to the second network being an Internet to provide Internet access for the LAN and accesses to the Internet from the LAN are intercepted for processing.

4. The apparatus of claim 2 wherein said processor filters certain selected attempted accesses to the router to prevent retrieval of data from a destination location noted in the attempted access.

5. The apparatus of claim 1 wherein said storage medium functions as a cache memory to cache data returned from the router.

6. The apparatus of claim 1 wherein said storage medium functions as a web cache to cache a web page returned from the router.

7. The apparatus of claim 1 wherein said first interface receives data addressed to the first interface and said processor interpreting the address as a switch to a command mode to provide processing in accordance with instructions present in the data.

8. The apparatus of claim 1 wherein said first interface receives data intended for the router, but having special coding in its address and said processor interpreting the special coding as a switch to a command mode to provide processing in accordance with instructions present in the data.

9. The apparatus of claim 1 wherein said storage medium further including a table to retain source information for sources attempting access onto the Internet and sending returned data to corresponding sources based on source information stored in the table.

10. The apparatus of claim 1, wherein the storage medium comprises a random access memory and a disk.

11. The apparatus of claim 10, wherein the random access memory to store a table that comprises Internet Protocol (IP) addresses of devices on the network to corresponding Media Access Control (MAC) addresses of the devices.

12. The apparatus of claim 10, wherein the disk comprises a program for execution by said processor to control operations of the apparatus.

13. An apparatus for insertion between a network and its router for transparently processing data sent between the network and the router comprising:
    a first interface coupled to the network;
    a second interface coupled to the router;
    a processor coupled to said first and second interfaces, to receive data from the network and to pass the data to the router until a response is provided by the router in response to an access from the network, the response allowing said processor to learn the address of the router;
    said processor then adjusts said first interface to receive data destined for the router, processes the data without having devices on the network reconfigured to perform the processing, and filter selected attempted accesses to the router to prevent retrieval of data from a destination location noted in the attempted access by the network.

14. An apparatus for insertion between a network and its router for transparently processing data sent between the network and the router comprising:
    a first interface coupled to the network;
    a second interface coupled to the router;
    a processor coupled to said first and second interfaces, to receive data from the network and to pass the data to the router until a response is provided by the router in response to an access from the network, the response allowing said processor to learn the address of the router, said processor then adjusts said first interface to receive data destined for the router and processing the data without having devices on the network reconfigured to perform the processing; and
    a storage medium to store data returned from the router in response to the access from the network.

15. The apparatus of claim 14 wherein said storage medium functions as a cache memory to cache data returned from the router, the cached data being returned to the network as cached data when subsequent accesses are attempted to the router to retrieve original data.

16. The apparatus of claim 15 wherein the router is coupled to provide Internet and World Wide Web access and said storage medium functions as a web cache to cache a web page returned from the router.

17. A system for transparently processing data between a network and a router comprising:
    a local area network (LAN) for having a plurality of users coupled thereto;
    a router for coupling the LAN to a second network;
    a device inserted between said LAN and said router for transparently processing data transferred between said LAN and said router, said device that comprises a processor and a storage medium to store data returned from the router in response to an access from said LAN receives data from said LAN and passes the data to said router until a response is provided by said router in response to an access from said LAN, the response allowing said device to learn the address of said router;
    said device then adjusts to receive data destined for said router and processing the data without having the user's reconfigured to perform the processing.

18. The system of claim 17 wherein said storage medium functions as a cache memory to cache data returned from said router, the cached data being returned to said LAN as cached data when subsequent accesses are attempted to said router to retrieve original data.

19. The system of claim 18 wherein the router is coupled to provide Internet and World Wide Web access and said storage medium functions as a web cache to cache a web page returned from said router.

20. A system for transparently processing data between a network and a router comprising:
    a local area network (LAN) for having a plurality of users coupled thereto;
    a router for coupling the LAN to a second network;
    a device inserted between said LAN and said router for transparently processing data transferred between said LAN and said router, said device receives data from said LAN and passes the data to said router until a response is provided by said router in response to an access from said LAN, the response allowing said device to learn the address of said router;
    said device then adjusts to receive data destined for said router, processes the data without having the user's reconfigured to perform the processing, and filters certain selected attempted accesses to said router to prevent retrieval of data from a destination location noted in the attempted access by said LAN.

21. A method of providing transparent processing of data being transferred between a network and its router comprising:
    inserting an interception connection between the network and the router;
    receiving data from the network and passing the data to the router until a response is provided by the router in response to an access from the network;
    learning the address of the router from the response;
    adjusting the interception connection to receive data destined for the router;
    receiving transparent to a sending source the data being sent to the router at the interception connection;
    processing the data without having the sending source on the network reconfigured to perform the processing, said processing includes filtering certain selected attempted accesses to the router to prevent retrieval of data from a destination location noted in the attempted access by the network.

22. The method of claim 21 wherein said interception connection operates in a promiscuous mode until the address of the router is learned.

23. The method of claim 21 further comprising sending of a control signal for the interception connection by addressing data to have an address associated with the interception connection.

24. The method of claim 21 further comprising sending of a control signal for the interception connection by adding a special coding in sending data to the router.

25. A method of providing transparent processing of data being transferred between a network and its router comprising:

inserting an interception connection between the network and the router;

receiving data from the network and passing the data to the router until a response is provided by the router in response to an access from the network;

learning the address of the router from the response;

adjusting the interception connection to receive data destined for the router;

receiving transparent to a sending source the data being sent to the router at the interception connection;

processing the data without having the sending source on the network reconfigured to perform the processing, said processing includes checking a destination location noted in certain selected attempted accesses to the router by the network and returning cached data if the attempted access is to data already cached.

26. The method of claim 25 wherein said router is coupled to access the Internet and its World Wide Web.

27. The method of claim 25, wherein the network is a local area network (LAN).

* * * * *